US 9,706,587 B2

(12) United States Patent
Qi et al.

(10) Patent No.: US 9,706,587 B2
(45) Date of Patent: Jul. 11, 2017

(54) METHOD AND APPARATUS FOR ESTABLISHING DIRECT TUNNEL

(71) Applicant: Huawei Technologies Co., Ltd., Shenzhen (CN)

(72) Inventors: Caixia Qi, Shanghai (CN); Yu Yin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 169 days.

(21) Appl. No.: 14/497,771

(22) Filed: Sep. 26, 2014

(65) Prior Publication Data
US 2015/0049719 A1 Feb. 19, 2015

Related U.S. Application Data

(63) Continuation of application No. PCT/CN2012/073171, filed on Mar. 28, 2012.

(51) Int. Cl.
*H04W 4/00* (2009.01)
*H04W 76/02* (2009.01)

(52) U.S. Cl.
CPC ....... *H04W 76/022* (2013.01); *H04W 76/026* (2013.01); *H04W 76/028* (2013.01)

(58) Field of Classification Search
CPC H04W 76/022; H04W 76/026; H04W 76/028
See application file for complete search history.

(56) References Cited

U.S. PATENT DOCUMENTS

2009/0238159 A1* 9/2009 Takano ................. H04L 45/124
370/338
2010/0322068 A1* 12/2010 Grahn ................. H04W 76/021
370/217

(Continued)

FOREIGN PATENT DOCUMENTS

CN 101090362 A 12/2007
CN 101094152 A 12/2007

(Continued)

OTHER PUBLICATIONS

"3rd Generation Partnership Project; Technical Specification Group Services and System Aspects; General Packet Radio Service (GPRS); Service description; Stage 2 (Release 9)," 3GPP TS 23.060, V9.11.0, Dec. 2011, 13 pages.

(Continued)

*Primary Examiner* — Abdelnabi O Musa
(74) *Attorney, Agent, or Firm* — Slater Matsil, LLP (57) ABSTRACT

The present invention discloses a method and an apparatus for establishing a direct tunnel, which relate to the field of communications network technologies and can reduce the number of signaling messages that need to be processed on a GGSN or an SGW and reduce signaling load on the GGSN or the SGW. In the embodiments of the present invention, a mobility management network element determines that a character of a user terminal satisfies a preset condition for establishing a direct tunnel; a request message is sent to a gateway to establish a downlink direct tunnel between a radio access network and the gateway; and a response message sent by the gateway is received, where the response message is used to confirm that the downlink direct tunnel between the radio access network and the gateway has been successfully established.

18 Claims, 6 Drawing Sheets

(56) References Cited

U.S. PATENT DOCUMENTS

| | | | | |
|---|---|---|---|---|
| 2011/0222430 A1* | 9/2011 | Angervuori | ......... | H04L 12/4633 370/252 |
| 2011/0228750 A1* | 9/2011 | Tomici | ................. | H04W 8/082 370/338 |
| 2011/0274087 A1* | 11/2011 | Liang | ................. | H04W 76/064 370/331 |
| 2011/0280173 A1* | 11/2011 | Ha | ...................... | H04W 76/041 370/312 |
| 2012/0014365 A1* | 1/2012 | Takano | .............. | H04L 63/0272 370/338 |

FOREIGN PATENT DOCUMENTS

| | | |
|---|---|---|
| CN | 101400148 A | 4/2009 |
| CN | 101753638 A | 6/2010 |
| CN | 102056145 A | 5/2011 |
| CN | 102224712 A | 10/2011 |
| CN | 102238757 A | 11/2011 |
| EP | 1475981 A1 | 11/2004 |
| EP | 2088797 A1 | 8/2009 |
| JP | 2009535980 A | 10/2009 |
| JP | 2012509628 A | 4/2012 |
| WO | 03067912 A1 | 8/2003 |
| WO | 2007130281 A2 | 11/2007 |
| WO | 2010057529 A1 | 5/2010 |
| WO | 2013004272 A1 | 1/2013 |

OTHER PUBLICATIONS

"3rd Generation Partnership Project; Technical Specification Group Services and System Aspects; General Packet Radio Service (GPRS); Service Description; Stage 2 (Release 9)," 3GPP TS 23.060, V9.4.0, Mar. 2010, 297 pages.

\* cited by examiner

METHOD AND APPARATUS FOR ESTABLISHING DIRECT TUNNEL

This application is a continuation of International Application No. PCT/CN2012/073171, filed on Mar. 28, 2012, which is hereby incorporated by reference in its entirety.

TECHNICAL FIELD

The present invention relates to the field of communications technologies and, in particular embodiments, to a method and an apparatus for establishing a direct tunnel.

BACKGROUND

GTP (General Packet Radio Service Tunneling Protocol) is a communications protocol that is widely applied between network elements of a GPRS network, for example, applied between an SGSN (Serving GPRS Support Node) and a GGSN (Gateway GPRS Support Node), and GTP will continue to be used in an EPS (Evolved Packet System). GTP is used to forward a signaling message and a service data packet. A network element using the GTP protocol identifies a GTP tunnel by using an IP address, a UDP (User Datagram protocol) port number, and a TEID (Tunnel Endpoint Identifier).

A direct tunnel is one of user plane tunnel modes in a GPRS network and may also be used in an EPS network. An RNC (Radio Network Controller) and a GGSN or an SGW (Serving Gateway) directly establish a user plane tunnel by using the SGW in the EPS network, and uplink and downlink user plane data packets are directly forwarded between the RNC and the GGSN (or the SGW), without the need to pass through an SGSN. When a user terminal is idle, in a direct tunnel mode, the SGSN updates a user plane tunnel on the GGSN (or the SGW) by using a signaling message and establishes a user plane tunnel between the SGSN and the GGSN (or the SGW). When downlink data packets of a user terminal in an idle state are forwarded to the SGSN through a corresponding user plane tunnel, the SGSN initiates a paging process to trigger the user terminal to initiate a service request process, so as to establish a signaling connection and a radio bearer between the user terminal and the network and change the user terminal into a connected state. In the service request process, if the SGSN decides to establish a direct tunnel, the SGSN separately exchanges a signaling message with the RNC and the GGSN (or the SGW) to exchange tunnel endpoint identifiers of the RNC and the GGSN (or the SGW), and establishes a direct tunnel between the RNC and the GGSN (or the SGW). In addition, the service request process may also be actively initiated by the user terminal. A mechanism of the direct tunnel can reduce the number of path hops for forwarding a user plane data packet, thereby reducing a service delay.

However, due to features of some services or terminals, to establish a direct tunnel or to cancel a direct tunnel, the SGSN frequently sends a signaling message to the GGSN or the SGW, which leads to an increase in the number of signaling messages that need to be processed on the GGSN or the SGW and increases signaling load on the GGSN or the SGW.

SUMMARY

Embodiments of the present invention provide a method and an apparatus for establishing a direct tunnel, which can reduce the number of signaling messages that need to be processed on a GGSN or an SGW and reduce signaling load on the GGSN or the SGW.

A method for establishing a direct tunnel is disclosed. A mobility management network element determines that a character of a user terminal satisfies a preset condition for establishing a direct tunnel. A request message is sent to a gateway to establish a downlink direct tunnel between a radio access network and the gateway. A response message sent by the gateway confirms that the downlink direct tunnel between the radio access network and the gateway has been successfully established.

An apparatus for establishing a direct tunnel is also disclosed. A determining unit is configured to determine that a character of a user terminal satisfies a preset condition for establishing a direct tunnel. A sending unit is configured to send a request message to a gateway to establish a downlink direct tunnel between a radio access network and the gateway. A receiving unit is configured to receive a response message sent by the gateway to confirm that the downlink direct tunnel between the radio access network and the gateway has been successfully established.

In a method and an apparatus for establishing a direct tunnel provided by the embodiments of the present invention, it is determined that a character of a user terminal satisfies a preset condition for establishing a direct tunnel. A request message is sent to a gateway to establish a downlink direct tunnel between a radio access network and the gateway. A response message sent by the gateway is received. The response message is used to confirm that the downlink direct tunnel between the radio access network and the gateway has been successfully established. In the prior art, when a direct tunnel is established, a signaling message is frequently sent to a GGSN or an SGW, which leads to an increase in the number of signaling messages that need to be processed on the GGSN or the SGW and increases signaling load on the GGSN or the SGW. The solutions provided in the embodiments of the present invention can reduce the number of signaling messages that need to be processed on the GGSN or the SGW, reduce the signaling load on the GGSN or the SGW, and meanwhile ensuring delay requirements of some services.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
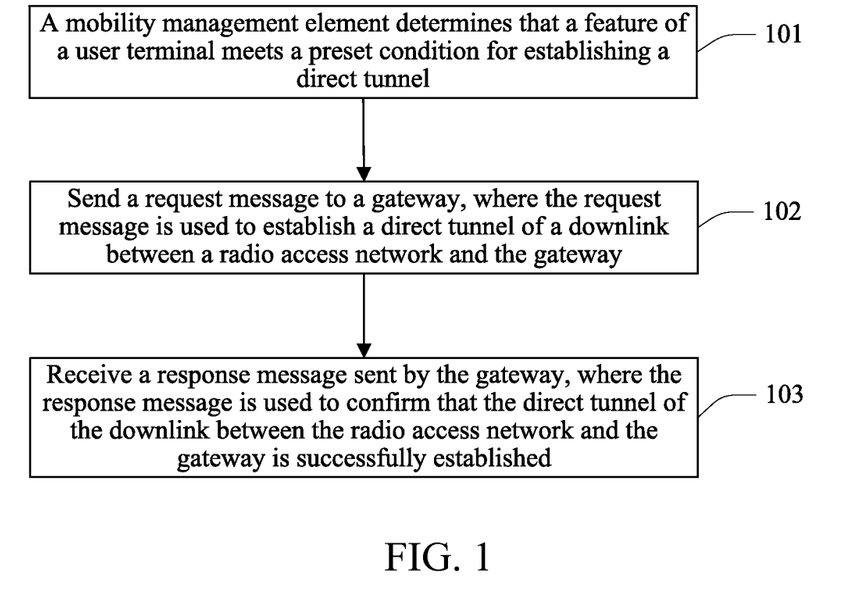
FIG. 1 is a flowchart of a method for establishing a direct tunnel according to Embodiment 1 of the present invention.

An embodiment of the present invention provides a method for establishing a direct tunnel. As shown in FIG. 1, the method includes the following steps.

Step 101: A mobility management network element determines that a character of a user terminal satisfies a preset condition for establishing a direct tunnel.

The character of the user terminal includes at least one of a signaling character of the user terminal and a service attribute of the user terminal, where the signaling character of the user terminal includes at least one of a frequency of switch between a connected state and an idle state of the user terminal and a type of the user terminal, and the service attribute of the user terminal includes at least one of a duration of a service corresponding to a PDP context of the user terminal or a bearer context of the user terminal, a type of the service, a duration of downlink data packets corresponding to the PDP context of the user terminal or the bearer context of the user terminal, a quantity of the downlink data packets, traffic of the downlink data packets, and a time interval between the downlink data packets.

Optionally, the frequency of switch between the connected state and the idle state of the user terminal is counted, and the mobility management network element determines that the frequency falls in a preset frequency range; or the mobility management network element determines that the type of the user terminal falls in a preset type range; or the mobility management network element counts a duration of a received service corresponding to the PDP context of the user terminal or the bearer context of the user terminal, where the duration falls in a preset duration range; or the mobility management network element counts the quantity of the downlink data packets corresponding to the PDP context of the user terminal or the bearer context of the user terminal, where the quantity falls in a preset quantity range; or the mobility management network element counts the traffic of the downlink data packets corresponding to the PDP context of the user terminal or the bearer context of the user terminal, where the traffic falls in a preset traffic range; or the mobility management network element counts the time interval between the downlink data packets corresponding to the PDP context of the user terminal or the bearer context of the user terminal, where the time interval falls in a preset time interval range; or the mobility management network element determines that the type of the service corresponding to the PDP context of the user terminal or the bearer context of the user terminal is a preset service type.

Step 102: Send a request message to a gateway, where the request message is used to establish a downlink direct tunnel between a radio access network and the gateway.

Optionally, the preset condition for establishing a direct tunnel is configured on the mobility management network element; or the preset condition for establishing a direct tunnel is configured on an operation and maintenance network element or a parameter delivery network element and is delivered to the mobility management network element. The parameter delivery network element may be a network element such as a policy and charging rules function network element or a data gateway.

The gateway may be a data gateway and may also be a serving gateway.

Step 103: Receive a response message sent by the gateway, where the response message is used to confirm that the downlink direct tunnel between the radio access network and the gateway has been successfully established.

The gateway establishes the direct tunnel according to the user plane IP address of an RNC and the downlink user plane tunnel endpoint identifier allocated by the RNC that are carried in the received request message, and then sends the response message to the mobility management network element, so that a downlink service data packet corresponding to the PDP context of the user terminal or the bearer context of the user terminal can be sent to the radio access network through the established direct tunnel by using a data gateway or a serving gateway.

In a method for establishing a direct tunnel provided by this embodiment of the present invention, it is determined that a character of a user terminal satisfies a preset condition for establishing a direct tunnel; a request message is sent to a gateway to establish a downlink direct tunnel between a radio access network and the gateway; and a response message sent by the gateway is received, where the response message is used to confirm that the downlink direct tunnel between the radio access network and the gateway has been successfully established. In this embodiment of the present invention, according to the character of the user terminal, a downlink direct tunnel established for the user terminal that frequently switches between a connected state and an idle state is reduced. Therefore, this can reduce the number of signaling messages that need to be processed on a GGSN or an SGW, reduce signaling load on the GGSN or the SGW, and meanwhile ensure delay requirements of some services.

Figure 2:
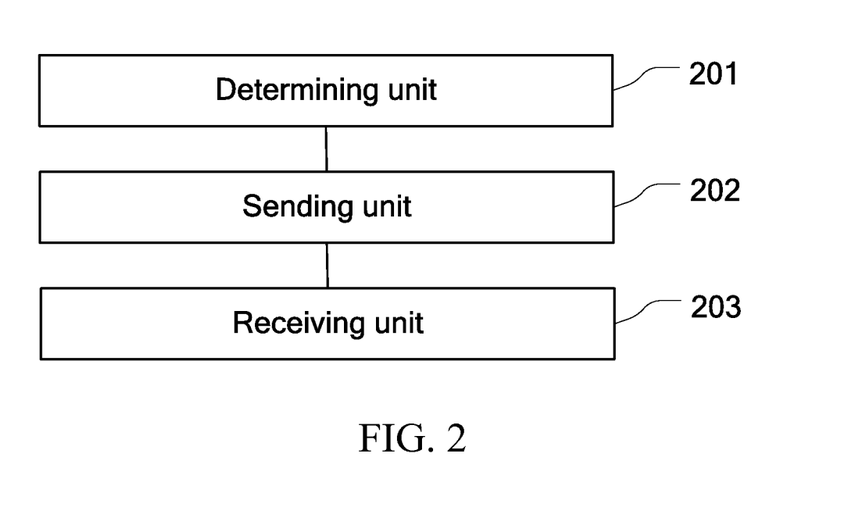
FIG. 2 is a block diagram of an apparatus for establishing a direct tunnel according to Embodiment 1 of the present invention.

This embodiment of the present invention provides an apparatus for establishing a direct tunnel, where the apparatus may be a mobility management network element. As shown in FIG. 2, the apparatus includes a determining unit 201, a sending unit 202, and a receiving unit 203.

The determining unit 201 is configured to determine that a character of a user terminal satisfies a preset condition for establishing a direct tunnel.

The character of the user terminal includes at least one of a signaling character of the user terminal and a service attribute of the user terminal, where the signaling character of the user terminal includes at least one of a frequency of switch between a connected state and an idle state of the user terminal and a type of the user terminal, and the service attribute of the user terminal includes at least one of a duration of a service corresponding to a PDP context of the user terminal or a bearer context of the user terminal, a type of the service, a duration of downlink data packets corresponding to the PDP context of the user terminal or the bearer context of the user terminal, a quantity of the downlink data packets, traffic of the downlink data packets, and a time interval between the downlink data packets.

Further, a first counting module in the determining unit is configured to count the frequency of switch between the connected state and the idle state of the user terminal; and a first determining module is configured to determine that the frequency falls in a preset frequency range.

Further, the determining unit is specifically configured to determine that the type of the user terminal falls in a preset type range.

Further, a second counting module in the determining unit is configured to count a duration of a received service corresponding to the PDP context of the user terminal or the bearer context of the user terminal, and a second determining module is configured to determine that the duration falls in a preset duration range; or the second counting module is configured to count the quantity of the downlink data packets corresponding to the PDP context of the user terminal or the bearer context of the user terminal, and the second determining module is configured to determine that the quantity falls in a preset quantity range; or the second counting module is configured to count the traffic of the downlink data packets corresponding to the PDP context of the user terminal or the bearer context of the user terminal, and the second determining module is configured to determine that the traffic falls in a preset traffic range; or the second counting module is configured to count the time interval between the downlink data packets corresponding to the PDP context of the user terminal or the bearer context of the user terminal, and the second determining module is configured to determine that the time interval falls in a preset time interval range.

Further, the determining unit is specifically configured to determine that the type of the service corresponding to the PDP context of the user terminal or the bearer context of the user terminal is a preset service type.

It should be noted that functions of the determining unit may be completed by the first counting module and the first determining module and may also be completed by the second counting module and the second determining module.

The sending unit 202 is configured to send a request message to a gateway, where the request message is used to establish a downlink direct tunnel between a radio access network and the gateway.

Optionally, the preset condition for establishing a direct tunnel is configured on the mobility management network element; or the preset condition for establishing a direct tunnel is configured on an operation and maintenance network element or a parameter delivery network element and is delivered to the mobility management network element.

The receiving unit 203 is configured to receive a response message sent by the gateway, where the response message is used to confirm that the downlink direct tunnel between the radio access network and the gateway has been successfully established.

In an apparatus for establishing a direct tunnel provided by this embodiment of the present invention, a determining unit determines that a character of a user terminal satisfies a preset condition for establishing a direct tunnel; a sending unit sends a request message to a gateway, where the request message is used to establish a downlink direct tunnel between a radio access network and the gateway; and a receiving unit receives a response message sent by the gateway, where the response message is used to confirm that the downlink direct tunnel between the radio access network and the gateway has been successfully established. In this embodiment of the present invention, according to the character of the user terminal, a downlink direct tunnel established for the user terminal that frequently switches between a connected state and an idle state is reduced. Therefore, this can reduce the number of signaling messages that need to be processed on a GGSN or an SGW, reduce signaling load on the GGSN or the SGW, and meanwhile ensure delay requirements of some services.

Embodiment 2

An embodiment of the present invention provides a method for establishing a direct tunnel, and an application scenario of the method is as follows: In a GPRS network or an EPS network, a direct tunnel is established when a mobility management network element initiates a paging process for a user terminal in an idle state so as to trigger the user terminal to initiate a service request process, or when the user terminal actively initiates the service request process.

In the GPRS network, a radio access network is an RNS (Radio Network Subsystem) using 3GPP (3rd Generation Partnership Project) access of a UTRAN (Universal Terrestrial Radio Access Network), the mobility management network element is an SGSN, and a data gateway is a GGSN.

Figure 3:
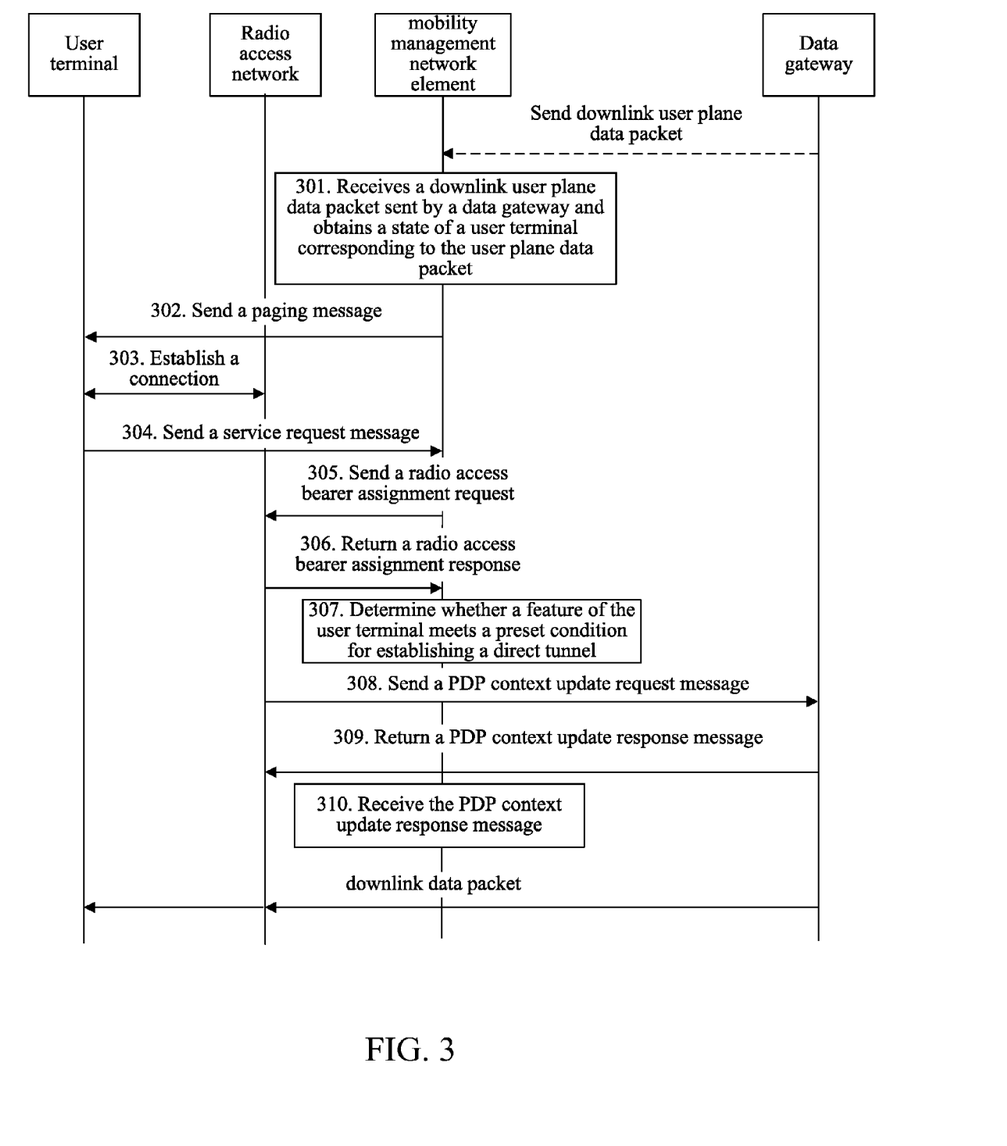
FIG. 3 is a flowchart of a method for establishing a direct tunnel in a GPRS network according to Embodiment 2 of the present invention.

As shown in FIG. 3, the method includes the following steps.

Step 301: A mobility management network element receives a downlink user plane data packet sent by a data gateway and obtains a state of a user terminal corresponding to the user plane data packet.

The mobility management network element obtains the state of the user terminal by using a user context corresponding to the received downlink user plane data packet; if the user context does not include user plane information of a downlink, it indicates that the user terminal is in an idle state; and if the user context includes user plane information of a downlink, it indicates that the user terminal is in a connected state. The user plane information of the downlink is a user plane IP address and a tunnel endpoint identifier of a PDP context allocated by an RNC.

Step 302: When the user terminal is in the idle state, the mobility management network element initiates a paging process for the user terminal and sends a paging message to the user terminal.

It should be noted that when the user terminal needs to send a user plane data packet, the user terminal may also actively initiate a service request process; in this case, step 301 and step 302 are not performed, that is, the paging process is not initiated, and establishing a connection with a radio access network and its subsequent operations are performed directly.

Step 303: After detecting the paging message, the user terminal establishes a connection with the radio access network.

After the user terminal detects the paging message, the user terminal restores a signaling connection with the network by using a radio resource connection establishment process.

Step 304: The user terminal sends a service request message to the mobility management network element.

After establishing the connection with the radio access network, the user terminal sends the service request message to the mobility management network element, where the service request message carries a user identifier of the user terminal, so that the mobility management network element establishes a bearer of the user terminal.

Optionally, the mobility management network element may perform a security function, complete authentication on the user terminal, and obtain a security vector on an HLR (Home Location Register), so as to encrypt a signaling message on a control plane. The HLR is responsible for managing and maintaining home user subscription information.

Step 305: The mobility management network element sends a radio access bearer assignment request to the radio access network to establish an uplink direct tunnel between the radio access network and the data gateway, where the radio access bearer assignment request includes a user plane IP address of the data gateway and an uplink user plane tunnel endpoint identifier of the PDP context allocated by the data gateway.

It should be noted that when the mobility management network element decides to establish a direct tunnel for a PDP context corresponding to downlink data packets, the radio access bearer assignment request sent to the radio access network carries the user plane IP address of the data gateway and the uplink user plane tunnel endpoint identifier of the PDP context allocated by the data gateway. In this way, uplink data packets corresponding to the PDP context of the user terminal are sent to the data gateway through the direct tunnel over the radio access network. Downlink data packets are sent to the mobility management network element through an indirect tunnel by using the data gateway and then are forwarded to the radio access network.

The indirect tunnel may also be referred to as a two-section tunnel mode; for example, in the GPRS network, a tunnel corresponding to a same PDP context has two sections, a user plane tunnel is established between the GGSN and the SGSN, and a user plane tunnel is established between the SGSN and the RNC. The direct tunnel may also be referred to as a one-section tunnel mode; for example, in the GPRS network, a tunnel corresponding to a same PDP context has one section, and a user plane tunnel is directly established by the RNC and the GGSN. A direct tunnel mode can improve the forwarding efficiency of a user plane data packet, reduce a service delay, and improve service experience of the user terminal. In the prior art, if the mobility management network element decides to establish a direct tunnel for the PDP context of the user terminal, both an uplink and a downlink use the direct tunnel.

The uplink user plane tunnel endpoint identifier of the PDP context is allocated by the data gateway to the radio access network; optionally, when the user terminal changes from the connected state into the idle state, the mobility management network element stores an uplink user plane tunnel endpoint identifier of a PDP context that is previously sent by the data gateway by using a signaling message of a PDP activation process or an operation such as a PDP context update.

Step 306: The radio access network returns a radio access bearer assignment response message to the mobility management network element, where the radio access bearer assignment response is used to confirm that the uplink direct tunnel between the radio access network and the gateway has been successfully established.

After receiving the radio access bearer assignment request sent by the mobility management network element, the radio access network sends a radio bearer establishment request to the user terminal, and the user terminal returns a radio bearer establishment complete message to the radio access network; after receiving the radio bearer establishment complete message, the radio access network sends the radio access bearer assignment response message to the mobility management network element.

It should be noted that the radio access bearer assignment response message includes a user plane IP address of a radio network controller RNC and a downlink user plane tunnel endpoint identifier allocated by the RNC; the user plane IP address of the RNC and the downlink user plane tunnel endpoint identifier allocated by the RNC are carried in the radio access bearer assignment response message, so as to establish a downlink direct tunnel between the radio access network and the data gateway.

The RNS is a radio network subsystem and is responsible for controlling resources of all the cells. Each RNS includes one RNC (Radio Network Controller) and one or more Node Bs. The RNC is a control part of the RNS, is responsible for managing various interfaces, and undertakes management of radio resources and radio parameters. Main functions of the RNC include a system information broadcast and access control function, mobility management functions such as handover and RNC migration, and resource management functions such as macro diversity combining, power control, and radio bearer allocation. The Node B is controlled by the RNC, serves a radio transceiver device of a certain cell, completes switching between the RNC and a radio channel, and implements radio transmission and a related control function through an air interface between the Node B and a mobile station.

Step 307: The mobility management network element determines whether a character of the user terminal satisfies a preset condition for establishing a direct tunnel.

When the mobility management network element determines that the character of the user terminal does not satisfy the preset condition for establishing a direct tunnel, the downlink direct tunnel between the radio access network and the data gateway is not established for the user terminal, so as to reduce the number of signaling messages that need to be processed, and reduce signaling load of the data gateway; when the mobility management network element determines that the character of the user terminal satisfies the preset condition for establishing a direct tunnel, step 308 is performed.

Step 308: When determining that the character of the user terminal satisfies the preset condition for establishing a direct tunnel, the mobility management network element sends a Packet Data Protocol PDP context update request message to the data gateway, where the PDP context update request message includes the user plane IP address of the RNC and the downlink user plane tunnel endpoint identifier allocated by the RNC, and the PDP context update request message is used to establish the downlink direct tunnel between the radio access network and the data gateway.

Optionally, the preset condition for establishing a direct tunnel is configured on the mobility management network element; or the preset condition for establishing a direct tunnel is configured on an operation and maintenance network element or a parameter delivery network element and is delivered to the mobility management network element. The parameter delivery network element may be a network element such as a policy and charging rules network element and a data gateway.

Optionally, the mobility management network element decides, according to the character of the user terminal, to establish the downlink direct tunnel for the PDP context of the user terminal. The character of the user terminal includes at least one of a signaling character of the user terminal and a service attribute of the user terminal, where the signaling character of the user terminal includes at least one of a frequency of switch between the connected state and the idle state of the user terminal and a type of the user terminal, and the service attribute of the user terminal includes at least one of a duration of a service of the PDP context of the user terminal, a type of the service, a duration of downlink data packets corresponding to the PDP context of the user terminal, a quantity of the downlink data packets, traffic of the downlink data packets, and a time interval between the downlink data packets.

For example, when the preset condition for establishing a direct tunnel is a preset state switching frequency threshold range, the mobility management network element counts the frequency of switch between the connected state and the idle state of the user terminal, and when the counted state switching frequency is determined to fall in the preset state switching frequency threshold range, sends the Packet Data Protocol PDP context update request message to the gateway, and establishes the downlink direct tunnel between the radio access network and the gateway.

Optionally, the mobility management network element may count the frequency of switch between the connected state and the idle state of the user terminal by counting an occurrence frequency of an Iu interface release process and the service request process. An Iu interface is a connection interface between the RNC and the SGSN. When the Iu interface release process is performed, the user terminal changes into the idle state; when the service request process is performed, the user terminal changes into the connected state. When the frequency satisfies the preset frequency threshold range, for example, the user terminal performs state switching for less than 2 times within 5 minutes, and the user terminal performs the state switching for not more than 5 times within 3 hours, the mobility management network element establishes the downlink direct tunnel between the radio access network and the data gateway.

For example, when the preset condition for establishing a direct tunnel is a preset type of the user terminal, the mobility management network element determines that the type of the user terminal falls in the preset type range, sends a PDP context update request message to the gateway, and establishes the downlink direct tunnel between the radio access network and the gateway.

Optionally, the mobility management network element may obtain the type of the user terminal by using information included in a received signaling message that is sent by another network element. For example, the type of the user terminal is obtained by using information such as an international mobile equipment identity (International Mobile Equipment Identity, IMEI) or a user terminal type indication that are included in a received signaling message sent by a network element such as a radio access network, a data gateway, or a serving gateway. For example, when the preset type of the user terminal is a feature phone, the mobility management network element establishes the downlink direct tunnel between the radio access network and the data gateway if the type of the user terminal is the feature phone; the mobility management network element does not establish the direct tunnel of the downlink between the radio access network and the data gateway or the serving gateway if the type of the user terminal is a smartphone. The smartphone has features such as fast dormancy, platform and service heartbeats, and a push mechanism, and all these features cause the smartphone to frequently switch between the connected state and the idle state. That the mobility management network element does not establish the downlink direct tunnel between the radio access network and the data gateway or the serving gateway can reduce signaling messages that need to be processed on the data gateway or the serving gateway.

For example, when the preset condition for establishing a direct tunnel is a preset duration threshold of a service, the mobility management network element counts a duration of a received service corresponding to the PDP context of the user terminal, where the duration falls in the preset duration range. For example, when the duration of the service is greater than 3 s, or the duration of the service is greater than 2 s, the mobility management network element establishes the downlink direct tunnel between the radio access network and the data gateway. When the service continues, the user terminal remains in the connected state all the time. Longer duration of the service leads to easier establishment of the direct tunnel; and the establishing the direct tunnel can reduce the number of forwarding path hops for related user plane forwarding when the service continues and reduce a forwarding delay.

For example, when the preset condition for establishing a direct tunnel is a preset service type, the mobility management network element determines that the type of the service corresponding to the PDP context of the user terminal is the preset service type, sends the PDP context update request message to the data gateway, and establishes the downlink direct tunnel between the radio access network and the data gateway.

Optionally, the mobility management network element may obtain a service type corresponding to downlink data packets by means of deep packet parsing, may also obtain the service type of the downlink data packets by using a differentiated services code point or a flow label of an IP header of the downlink data packets or by using an extension header of a GTP header, and may also obtain the service type of the downlink data packets by using a signaling message sent by the data gateway or the serving gateway. For example, when the preset service type is a voice service or a video service, if the service type of the downlink data packets is the voice service or the service type of the downlink data packets is the video service, the mobility management network element establishes the downlink direct tunnel between the radio access network and the data gateway. If the service type of the downlink data packets is an instant messaging service, the mobility management network element does not establish the downlink direct tunnel between the radio access network and the data gateway. Different services may have different requirements for delay, some services are more sensitive to delay, whereas some services can tolerate longer delay. Establishing a direct tunnel for a service having a high delay requirement can exert an advantage of the direct tunnel and reduce the service delay.

For example, when the preset condition for establishing a direct tunnel is a preset duration threshold of downlink data packets, the mobility management network element counts a duration of downlink data packets corresponding to a current PDP context; for example, when the duration of the downlink data packets is greater than 1 s, or the duration of the downlink data packets is not less than 700 ms, the mobility management network element establishes the downlink direct tunnel between the radio access network and the data gateway. Longer duration of the downlink data packets leads to easier establishment of the direct tunnel; and the establishing the direct tunnel can reduce the number of forwarding path hops for user plane forwarding of the downlink data packets corresponding to the PDP context and reduce the forwarding delay.

For example, when the preset condition for establishing a direct tunnel is a preset a quantity of downlink data packets, the mobility management network element counts a quantity of downlink data packets corresponding to the PDP context of the user terminal, where the quantity falls in the preset quantity range; for example, when the quantity of the downlink data packets is not less than 10, the mobility management network element establishes the downlink direct tunnel between the radio access network and the data gateway. Longer the duration of the downlink data packets leads to easier establishment of the direct tunnel; and the establishing the direct tunnel can reduce the number of forwarding path hops for subsequent user plane forwarding of the downlink data packets and reduce the forwarding delay.

For example, when the preset condition for establishing a direct tunnel is preset traffic of downlink data packets, the mobility management network element counts traffic of downlink data packets corresponding to the PDP context of the user terminal, where the traffic falls in a preset traffic range; for example, when the traffic of the downlink data packets is greater than 1 M, or the traffic of the downlink data packets is not less than 300 K, the mobility management network element establishes the downlink direct tunnel between the radio access network and the data gateway. Larger traffic of the downlink data packets leads to easier establishment of the direct tunnel; and the establishing the direct tunnel can reduce the number of forwarding path hops for user plane forwarding of the downlink data packets corresponding to the PDP context and reduce the forwarding delay.

For example, when the preset condition for establishing a direct tunnel is a preset time interval between downlink data packets, the mobility management network element counts a time interval between downlink data packets corresponding to a PDP context, where the time interval falls in the preset time interval range; for example, when the time interval between the data packets is not greater than 2 s, or the time interval between the data packets is less than 3 s, the mobility management network element establishes the downlink direct tunnel between the radio access network and the data gateway. Longer time interval between the downlink data packets leads to a higher possibility of a switchover of the mobility management network element between the connected state and the idle state, and leads to inappropriate establishment of the direct tunnel.

It should be noted that a condition, for sending a request message to the data gateway, described in step 308 of the present invention may send a request message to the data gateway when one, a combination of any two, or any combination of more than two features of the user terminal satisfies the preset condition for establishing a direct tunnel; optionally, the preset condition for establishing a direct tunnel is set according to a specific application scenario.

Step 309: The data gateway returns a PDP context update response message to the mobility management network element, where the PDP context update response message is used to confirm that the direct tunnel has been successfully established according to the user plane IP address of the RNC and the downlink user plane tunnel endpoint identifier allocated by the RNC.

The data gateway establishes the direct tunnel between the gateway and the radio access network according to the user plane IP address of the RNC and the downlink user plane tunnel endpoint identifier allocated by the RNC, and a downlink service data packet corresponding to the PDP context of the user terminal is sent to the radio access network through the direct tunnel by using the data gateway.

Step 310: The mobility management network element receives the PDP context update response message sent by the data gateway.

In a method for establishing a direct tunnel provided by this embodiment of the present invention, it is determined that a character of a user terminal satisfies a preset condition for establishing a direct tunnel; a request message is sent to a data gateway, where the request message is used to establish a downlink direct tunnel between a radio access network and the gateway; and a response message sent by the data gateway is received, where the response message is used to confirm that the downlink direct tunnel between the radio access network and the data gateway has been successfully established. In this embodiment of the present invention, according to the character of the user terminal, a downlink direct tunnel established for the user terminal that frequently switches between a connected state and an idle state is reduced. Therefore, this can reduce the number of signaling messages that need to be processed on a GGSN or an SGW, reduce signaling load on the GGSN or the SGW, and meanwhile ensure delay requirements of some services.

An embodiment of the present invention provides another method for establishing a direct tunnel, and an application scenario of the method is as follows: In an EPS network, a direct tunnel is established when a mobility management network element initiates a service request process for a user terminal in an idle state, or when the user terminal actively initiates the service request process. In the EPS network, an access network is an RNS using 3GPP access of a UTRAN, the mobility management network element may be an SGSN, a serving gateway may be an SGW, and a data gateway may be a PGW (Packet Data Network Gateway).

Figure 4:
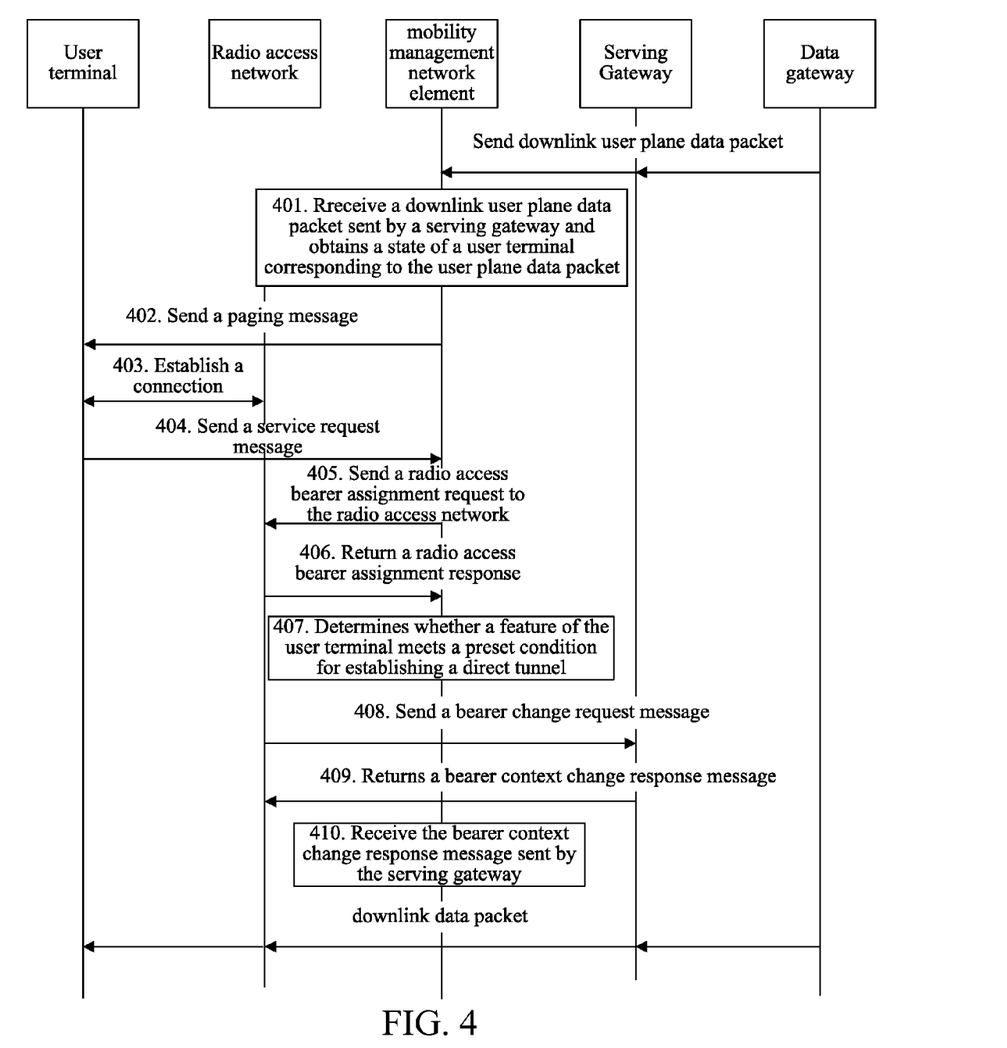
FIG. 4 is a flowchart of a method for establishing a direct tunnel in an EPS network according to Embodiment 2 of the present invention.

As shown in FIG. 4, the method includes the following steps.

Step 401: A mobility management network element receives a downlink user plane data packet sent by a serving gateway and obtains a state of a user terminal corresponding to the user plane data packet.

The mobility management network element obtains the state of the user terminal by using a user context corresponding to the received downlink user plane data packet; if the user context does not include user plane information of a downlink, it indicates that the user terminal is in an idle state; and if the user context includes user plane information of a downlink, it indicates that the user terminal is in a connected state. The user plane information of the downlink is a user plane IP address and a tunnel endpoint identifier of a PDP context/bearer context allocated by an RNC.

Step 402: When the user terminal is in the idle state, the mobility management network element initiates a paging process for the user terminal and sends a paging message to the user terminal.

It should be noted that when the user terminal needs to send a user plane data packet, the user terminal may also actively initiate a service request process; in this case, step 401 and step 402 are not performed, that is, the paging process is not initiated, and establishing a connection with a radio access network and subsequent operations are performed directly.

Step 403: After detecting the paging message, the user terminal establishes a connection with the radio access network.

Step 404: The user terminal sends a service request message to the mobility management network element.

After establishing the connection with the radio access network, the user terminal sends the service request message to the mobility management network element, where the service request message carries a user identifier of the user terminal, so that the mobility management network element establishes a bearer of the user terminal.

Optionally, the mobility management network element may perform a security function, complete authentication on the user terminal, and obtain a security vector on an HSS (Home Subscriber Server), so as to encrypt a signaling message on a control plane. The HSS is responsible for managing and maintaining home user subscription information.

Step 405: The mobility management network element sends a radio access bearer assignment request to the radio access network to establish an uplink direct tunnel between the radio access network and the serving gateway, where the radio access bearer assignment request includes a user plane IP address of the serving gateway and an uplink user plane tunnel endpoint identifier of a bearer allocated by the serving gateway.

It should be noted that when the mobility management network element decides to establish a direct tunnel for a bearer corresponding to downlink data packets, the radio access bearer assignment request sent to the radio access network carries the user plane IP address of the serving gateway and the uplink user plane tunnel endpoint identifier of the bearer allocated by the serving gateway. In this way, uplink data packets corresponding to the bearer context of the user terminal are sent to the serving gateway through the direct tunnel by using the radio access network. Downlink data packets are sent to the mobility management network element through an indirect tunnel by using the serving gateway and then are forwarded to the radio access network.

Step 406: The radio access network returns a radio access bearer assignment response message to the mobility management network element, where the radio access bearer assignment response is used to confirm that the uplink direct tunnel between the radio access network and the serving gateway has been successfully established.

It should be noted that the radio access bearer assignment response message includes a user plane IP address of a radio network controller RNC and a downlink user plane tunnel endpoint identifier allocated by the RNC; the user plane IP address of the RNC and the downlink user plane tunnel endpoint identifier allocated by the RNC are carried in the radio access bearer assignment response message, so as to establish a downlink direct tunnel between the radio access network and the serving gateway.

Step 407: The mobility management network element determines whether a character of the user terminal satisfies a preset condition for establishing a direct tunnel.

When the mobility management network element determines that the character of the user terminal does not satisfy the preset condition for establishing a direct tunnel, the downlink direct tunnel between the radio access network and the serving gateway is not established for the user terminal, so as to reduce the number of signaling messages that need to be processed, and reduce signaling load of the serving gateway; when the mobility management network element determines that the character of the user terminal satisfies the preset condition for establishing a direct tunnel, step 408 is performed.

Step 408: When determining that the character of the user terminal satisfies the preset condition for establishing a direct tunnel, the mobility management network element sends a bearer change request message to the serving gateway, where the bearer change request message includes the user plane IP address of the RNC and the downlink user plane tunnel endpoint identifier allocated by the RNC, and the bearer change request message is used to establish the downlink direct tunnel between the radio access network and the serving gateway.

Optionally, the preset condition for establishing a direct tunnel is configured on the mobility management network element; or the preset condition for establishing a direct tunnel is configured on an operation and maintenance network element or a parameter delivery network element and is delivered to the mobility management network element. The parameter delivery network element may be a network element such as a policy and charging rules network element and a data gateway.

Optionally, the mobility management network element decides, according to the character of the user terminal, to establish the downlink direct tunnel for the bearer context of the user terminal. The character of the user terminal includes at least one of a signaling character of the user terminal and a service attribute of the user terminal, where the signaling character of the user terminal includes at least one of a frequency of switch between the connected state and the idle state of the user terminal and a type of the user terminal, and the service attribute of the user terminal includes at least one of a duration of a service of the bearer context of the user terminal, a type of the service, a duration of downlink data packets corresponding to the bearer context of the user terminal, a quantity of the downlink data packets, traffic of the downlink data packets, and a time interval between the downlink data packets.

An operation of determining whether the character of the user terminal satisfies the preset condition for establishing a direct tunnel is the same as the operation process of step 308 in the embodiment corresponding to FIG. 3, except that the PDP context in the GPRS network is the bearer context in the EPS network. Therefore, details are not repeated in this step.

It should be noted that in step 408 of the present invention, a request message may be sent to the serving gateway when one, a combination of any two, or any combination of more than two features of the user terminal satisfies the preset condition for establishing a direct tunnel; optionally, the preset condition for establishing a direct tunnel is set according to a specific application scenario.

Step 409: The serving gateway returns a bearer context change response message to the mobility management network element, where the bearer context change response message is used to confirm that the direct tunnel has been successfully established according to the user plane IP address of the RNC and the downlink user plane tunnel endpoint identifier allocated by the RNC.

The serving gateway establishes the direct tunnel between the serving gateway and the radio access network according to the user plane IP address of the RNC and the downlink user plane tunnel endpoint identifier allocated by the RNC, and a downlink service data packet corresponding to the bearer context of the user terminal is sent to the radio access network through the direct tunnel by using the serving gateway.

Step 410: The mobility management network element receives the bearer context change response message sent by the serving gateway.

In a method for establishing a direct tunnel provided this embodiment of the present invention, it is determined that a character of a user terminal satisfies a preset condition for establishing a direct tunnel; a request message is sent to a serving gateway, where the request message is used to establish a downlink direct tunnel between a radio access network and the gateway; and a response message sent by the serving gateway is received, where the response message is used to confirm that the downlink direct tunnel between the radio access network and the serving gateway has been successfully established. In this embodiment of the present invention, according to the character of the user terminal, a downlink direct tunnel established for the user terminal that frequently switches between a connected state and an idle state is reduced. Therefore, this can reduce the number of signaling messages that need to be processed on a GGSN or an SGW, reduce signaling load on the GGSN or the SGW, and meanwhile ensure delay requirements of some services.

An embodiment of the present invention provides another method for establishing a direct tunnel, and an application scenario of the method is as follows: In a GPRS network or an EPS network, a direct tunnel is established when a user terminal initiates a PDP activation process. In the GPRS network, an access network is an RNS using 3GPP access of a UTRAN, a mobility management network element is an SGSN, and a data gateway is a GGSN. In addition, a solution provided in this embodiment of the present invention can be applied to a PDP context activation procedure initiated by the user terminal and can also be applied to a secondary PDP context activation procedure initiated by the user terminal. The present invention gives detailed description by using the PDP context activation procedure initiated by the user terminal as an example.

Figure 5:
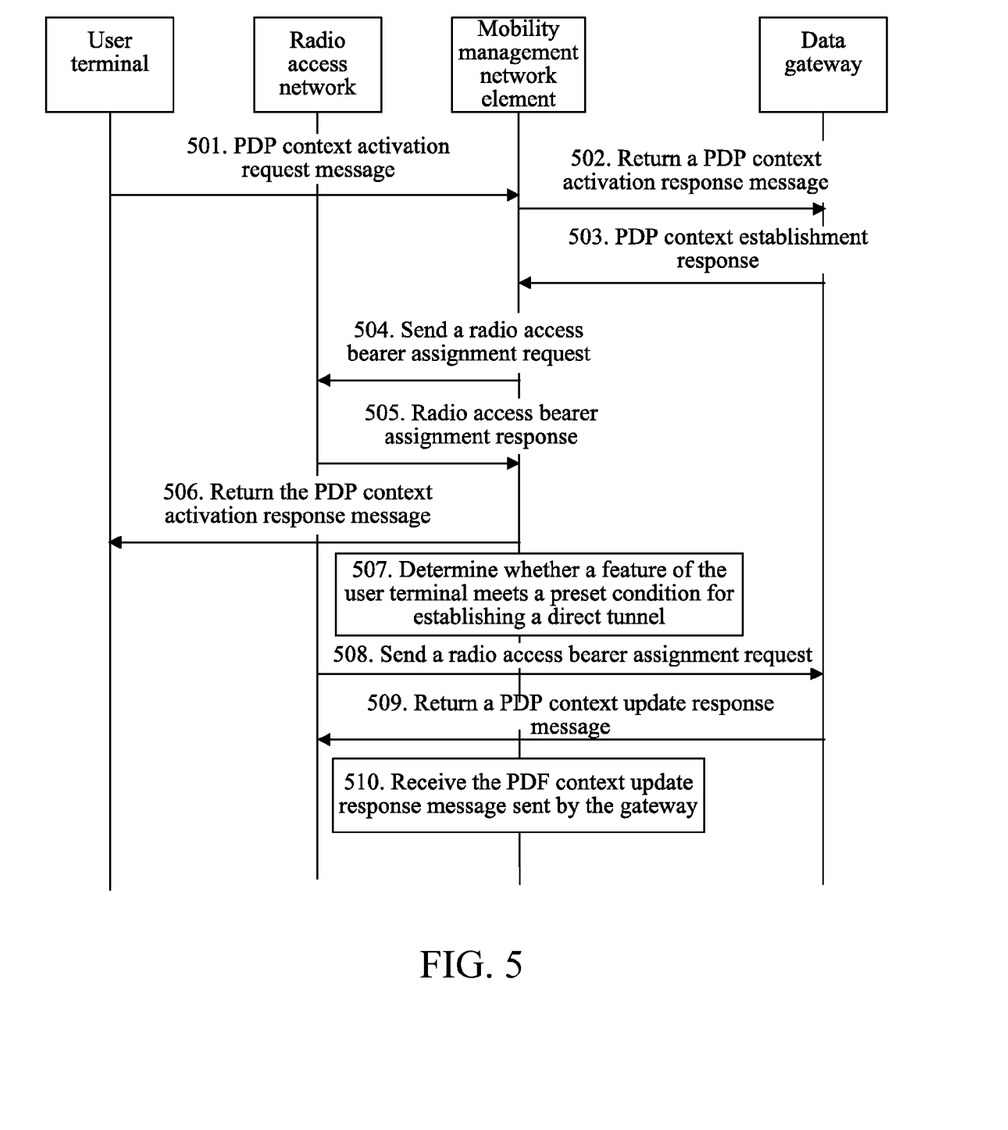
FIG. 5 is a flowchart of another method for establishing a direct tunnel in a GPRS network according to Embodiment 2 of the present invention.

As shown in FIG. 5, the method includes the following steps.

Step 501: A user terminal initiates a PDP context activation procedure and sends a PDP context activation request message to a mobility management network element.

The PDP context activation request message includes a PDP activation type, a PDP address, an APN (Access Point Name), a required QoS (Quality of Service), a PDP configuration option, and the like.

Step 502: The mobility management network element receives the PDP context activation request message sent by the user terminal and sends a PDP context establishment request to a data gateway.

Step 503: The data gateway receives the PDP context establishment request sent by the mobility management network element and returns a PDP context establishment response to the mobility management network element.

If the data gateway can satisfy a QoS, the PDP context establishment response is returned to the mobility management network element; if the data gateway cannot satisfy the QoS, a PDP context establishment rejection is returned to the mobility management network element.

The PDP context establishment response includes a user plane IP address of the data gateway and an uplink user plane tunnel endpoint identifier allocated by the data gateway, which are used to establish an uplink direct tunnel.

Step 504: The mobility management network element sends a radio access bearer assignment request to the radio access network, where the radio access bearer assignment request includes the user plane IP address of the data gateway and the uplink user plane tunnel endpoint identifier allocated by the data gateway.

Step 505: The radio access network returns a radio access bearer assignment response message to the mobility management network element, where the radio access bearer assignment response message includes a user plane IP address of a radio network controller RNC and a downlink user plane tunnel endpoint identifier allocated by the RNC.

Step 504 and step 505 are a process of obtaining the user plane IP address of the RNC and the downlink user plane tunnel endpoint identifier allocated by the RNC, which is the same as a process of performing step 305 and step 306 in the foregoing embodiment. For details, reference may be made to step 305 and step 306 in the foregoing embodiment, and details are not repeated herein.

Step 506: The mobility management network element returns a PDP context activation response message to the user terminal.

Step 507: The mobility management network element determines whether a character of the user terminal satisfies a preset condition for establishing a direct tunnel.

When the mobility management network element determines that the character of the user terminal does not satisfy the preset condition for establishing a direct tunnel, a downlink direct tunnel between the radio access network and the data gateway is not established for the user, so as to reduce the number of signaling messages that need to be processed, and reduce signaling load of the data gateway; when the mobility management network element determines that the character of the user terminal satisfies the preset condition for establishing a direct tunnel, step 508 is performed.

Step 508: When determining that the character of the user terminal satisfies the preset condition for establishing a direct tunnel, the mobility management network element sends a PDP context update request message to the data gateway to establish the downlink direct tunnel between the radio access network and the data gateway, where the PDP context update request message includes the user plane IP address of the RNC and the downlink user plane tunnel endpoint identifier allocated by the RNC.

Performing of step 508 is the same as performing of step 308 in the foregoing embodiment. For details, reference may be made to step 308.

It should be noted that a condition, for sending the request message to the data gateway, described in step 508 of the present invention, may be sending the request message to the data gateway when one, a combination of any two, or any combination of more than two features of the user terminal satisfies the preset condition for establishing a direct tunnel; optionally, the preset condition for establishing a direct tunnel is set according to a specific application scenario.

Step 509: The data gateway returns a PDP context update response message to the mobility management network element, where the PDP context update response message is used to confirm that the direct tunnel has been successfully established according to the user plane IP address of the RNC and the downlink user plane tunnel endpoint identifier allocated by the RNC.

Performing of step 509 is the same as performing of step 309 in the foregoing embodiment. For details, reference may be made to step 309.

The data gateway establishes the downlink direct tunnel between the gateway and the radio access network according to the user plane IP address of the RNC and the downlink user plane tunnel endpoint identifier allocated by the RNC, and a downlink service data packet corresponding to the PDP context of the user terminal is sent to the radio access network through the direct tunnel by using the data gateway.

Step 510: The mobility management network element receives the PDP context update response message sent by the data gateway.

In a method for establishing a direct tunnel provided by this embodiment of the present invention, when a character of a user terminal satisfies a preset condition for establishing a direct tunnel, a Packet Data Protocol PDP context update request message is sent to a data gateway, and the data gateway establishes a downlink direct tunnel between a radio access network and the data gateway according to the user plane IP address of an RNC and the downlink user plane tunnel endpoint identifier allocated by the RNC that are included in the PDP context update request message, and sends a PDP context update response message to a mobility management network element. In this embodiment of the present invention, according to the character of the user terminal, a downlink direct tunnel established for the user terminal that frequently switches between a connected state and an idle state is reduced. Therefore, this can reduce the number of signaling messages that need to be processed on a GGSN or an SGW, and reduce signaling load on the GGSN or the SGW.

An embodiment of the present invention provides another method for establishing a direct tunnel, and an application scenario of the method is as follows: In a GPRS network or an EPS network, a direct tunnel is established when a user terminal initiates a PDP activation procedure. In the EPS network, an access network is a RNS using 3GPP access of an UTRAN, a mobility management network element may be a SGSN, a serving gateway may be a SGW, and a data gateway may be a PGW. In addition, a solution provided in this embodiment of the present invention can be applied to a PDP context activation procedure initiated by the user terminal and can also be applied to a secondary PDP context activation procedure initiated by the user terminal. The present invention gives detailed description by using the first PDP context activation procedure initiated by the user terminal as an example.

Figure 6:
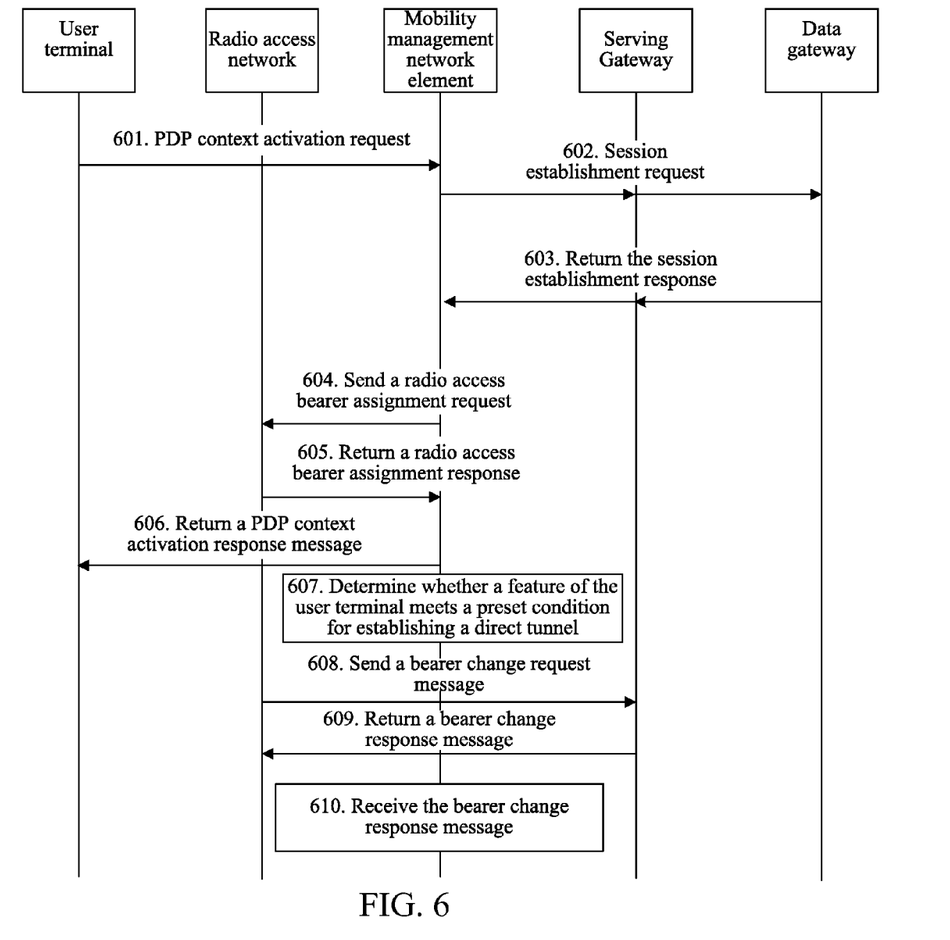
FIG. 6 is a flowchart of another method for establishing a direct tunnel in an EPS network according to Embodiment 2 of the present invention.

As shown in FIG. 6, the method includes the following steps.

Step 601: A user terminal initiates a PDP context activation procedure and sends a PDP context activation request message to a mobility management network element.

Step 602: The mobility management network element sends a session establishment request to a serving gateway.

Step 603: The serving gateway receives the session establishment request sent by the mobility management network element, forwards the session establishment request to a data gateway, and after receiving a response from the data gateway, returns a session establishment response to the mobility management network element.

The session establishment response includes a user plane IP address of the serving gateway and an uplink user plane tunnel endpoint identifier allocated by the serving gateway, which are used to establish an uplink direct tunnel.

Step 604: The mobility management network element sends a radio access bearer assignment request to the radio access network, where the radio access bearer assignment request includes the user plane IP address of the serving gateway and the uplink user plane tunnel endpoint identifier allocated by the serving gateway.

Step 605: The radio access network returns a radio access bearer assignment response message to the mobility management network element, where the radio access bearer assignment response message includes a user plane IP address of a radio network controller RNC and a downlink user plane tunnel endpoint identifier allocated by the RNC.

Step 604 and step 605 are a process of obtaining the user plane IP address of the RNC and the downlink user plane tunnel endpoint identifier allocated by the RNC, which is the same as a process of performing step 305 and step 306 in the foregoing embodiment. For details, reference may be made to step 305 and step 306 in the foregoing embodiment, and details are not repeated herein.

Step 606: The mobility management network element returns a PDP context activation response message to the user terminal.

Step 607: The mobility management network element determines whether a character of the user terminal satisfies a preset condition for establishing a direct tunnel.

When the mobility management network element determines that the character of the user terminal does not satisfy the preset condition for establishing a direct tunnel, a downlink direct tunnel between the radio access network and the serving gateway is not established for the user, so as to reduce the number of signaling messages that need to be processed, and reduce signaling load of the serving gateway; when the mobility management network element determines that the character of the user terminal satisfies the preset condition for establishing a direct tunnel, step 608 is performed.

Step 608: When determining that the character of the user terminal satisfies the preset condition for establishing a direct tunnel, the mobility management network element sends a bearer change request message to the serving gateway to establish the downlink direct tunnel between the radio access network and the serving gateway, where the bearer change request message includes the user plane IP address of the RNC and the downlink user plane tunnel endpoint identifier allocated by the RNC.

Performing of step 608 is the same as performing of step 308 in the foregoing embodiment. For details, reference may be made to step 308.

It should be noted that a condition, for sending a request message to the serving gateway, described in step 608 of the present invention may be sending a request message to the serving gateway when one, a combination of any two, or any combination of more than two features of the user terminal satisfies the preset condition for establishing a direct tunnel; optionally, the preset condition for establishing a direct tunnel is set according to a specific application scenario.

Step 609: The serving gateway returns a bearer change response message to the mobility management network element, where the bearer change response message is used to confirm that the direct tunnel has been successfully established according to the user plane IP address of the RNC and the downlink user plane tunnel endpoint identifier allocated by the RNC.

Performing of step 609 is the same as performing of step 309 in the foregoing embodiment. For details, reference may be made to step 309.

The serving gateway establishes the downlink direct tunnel between the gateway and the radio access network according to the user plane IP address of the RNC and the downlink user plane tunnel endpoint identifier allocated by the RNC, and a downlink service data packet corresponding to the PDP context of the user terminal is sent to the radio access network through the direct tunnel by using the serving gateway.

Step 610: The mobility management network element receives the bearer change response message sent by the serving gateway.

In a method for establishing a direct tunnel provided by this embodiment of the present invention, when a character of a user terminal satisfies a preset condition for establishing a direct tunnel, a bearer change request message is sent to a serving gateway, and the serving gateway establishes a downlink direct tunnel between a radio access network and the serving gateway according to the user plane IP address of an RNC and the downlink user plane tunnel endpoint identifier allocated by the RNC that are included in the bearer change request message, and sends a bearer change response message to a mobility management network element. In this embodiment of the present invention, according to the character of the user terminal, a downlink direct tunnel established for the user terminal that frequently switches between a connected state and an idle state is reduced. Therefore, this can reduce the number of signaling messages that need to be processed on a GGSN or an SGW, reduce signaling load on the GGSN or the SGW, and meanwhile ensure delay requirements of some services.

Figure 7:
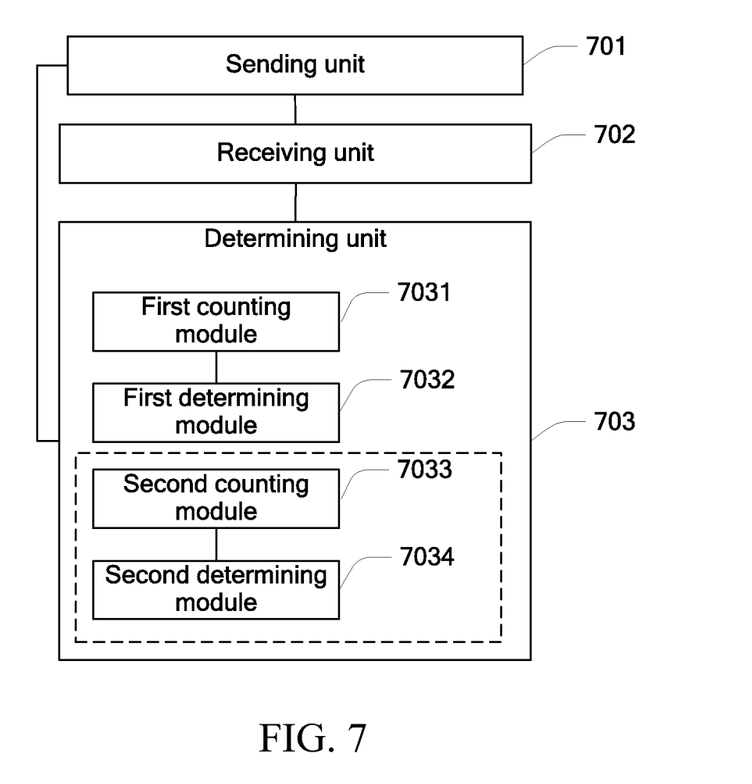
FIG. 7 is a simplified block diagram of an apparatus for establishing a direct tunnel according to Embodiment 2 of the present invention.

Corresponding to the method embodiments provided in this embodiment of the present invention, this embodiment of the present invention provides an apparatus for establishing a direct tunnel, where the apparatus may be a mobility management network element. As shown in FIG. 7, the apparatus includes a sending unit 701, a receiving unit 702, and a determining unit 703.

The sending unit 701 is configured to send a radio access bearer assignment request to a radio access network to establish an uplink direct tunnel between the radio access network and a gateway. The radio access bearer assignment request includes a user plane Internet Protocol IP address of the gateway and an uplink user plane tunnel endpoint identifier allocated by the gateway. The gateway includes a data gateway or a serving gateway.

The receiving unit 702 is configured to receive a radio access bearer assignment response sent by the radio access network. The radio access bearer assignment response is used to confirm that the uplink direct tunnel between the radio access network and the gateway has been successfully established. The radio access bearer assignment response includes a user plane Internet Protocol IP address of a radio network controller RNC and a downlink user plane tunnel endpoint identifier allocated by the RNC. The determining unit 703 is configured to determine that a character of a user terminal satisfies a preset condition for establishing a direct tunnel.

The character of the user terminal includes at least one of a signaling character of the user terminal and a service attribute of the user terminal, where the signaling character of the user terminal includes at least one of a frequency of switch between a connected state and an idle state of the user terminal and a type of the user terminal, and the service attribute of the user terminal includes at least one of a duration of a service corresponding to a PDP context of the user terminal or a bearer context of the user terminal, a type of the service, a duration of downlink data packets corresponding to the PDP context of the user terminal or the bearer context of the user terminal, a quantity of the downlink data packets, traffic of the downlink data packets, and a time interval between the downlink data packets.

Optionally, the preset condition for establishing a direct tunnel is configured on the mobility management network element; or the preset condition for establishing a direct tunnel is configured on an operation and maintenance network element or a parameter delivery network element and is delivered to the mobility management network element.

According to determining that the character of the user terminal satisfies the preset condition for establishing a direct tunnel, the sending unit 701 sends a request message to the gateway, where the request message is used to establish a downlink direct tunnel between the radio access network and the gateway;

the receiving unit 702 is configured to receive a response message sent by the gateway, where the response message is used to confirm that the downlink direct tunnel between the radio access network and the gateway has been successfully established.

Further, as shown in FIG. 7, the determining unit 703 includes a first counting module 7031 and a first determining module 7032. The first counting module 7031 in the determining unit 703 is configured to count the frequency of switch between the connected state and the idle state of the user terminal. The first determining module 7032 in the determining unit 703 is configured to determine that the frequency falls in a preset frequency range.

The determining unit 703 is specifically configured to determine that the type of the user terminal falls in a preset type range.

Further, as shown in FIG. 7, the determining unit 703 includes a second counting module 7033 and a second determining module 7034.

It should be noted that, as indicated by the dashed line in FIG. 7, functions of the determining unit may be completed by the first counting module 7031 and the first determining module 7032 and may also be completed by the second counting module 7033 and the second determining module 7034.

The second counting module 7033 in the determining unit 703 is configured to count a duration of a received service corresponding to the PDP context of the user terminal or the bearer context of the user terminal, and the second determining module 7034 in the determining unit 703 is configured to determine that the duration falls in a preset duration range; or the second counting module 7033 is configured to count the quantity of the downlink data packets corresponding to the PDP context of the user terminal or the bearer context of the user terminal, and the second determining module 7034 is configured to determine that the quantity falls in a preset quantity range; or the second counting module 7033 is configured to count the traffic of the downlink data packets corresponding to the PDP context of the user terminal or the bearer context of the user terminal, and the second determining module 7034 is configured to determine that the traffic falls in a preset traffic range; or the second counting module 7033 is configured to count the time interval between the downlink data packets corresponding to the PDP context of the user terminal or the bearer context of the user terminal, and the second determining module 7034 is configured to determine that the time interval falls in a preset time interval range.

Further, the determining unit 703 is specifically configured to determine that the type of the service corresponding to the PDP context of the user terminal or the bearer context of the user terminal is a preset service type.

Further, in a GPRS network, the sending unit 701 sends a PDP context update request message to the data gateway, where the PDP context update request message includes the user plane IP address of the RNC and the downlink user plane tunnel endpoint identifier allocated by the RNC. In an EPS network, the sending unit 701 sends a bearer change request message to the serving gateway. The bearer change request message includes the user plane IP address of the RNC and the downlink user plane tunnel endpoint identifier allocated by the RNC. The data gateway or the serving gateway establishes the direct tunnel between the gateway and the radio access network according to the user plane IP address of the RNC and the downlink user plane tunnel endpoint identifier allocated by the RNC, and a downlink service data packet corresponding to the PDP context of the user terminal or the bearer context of the user terminal is sent to the radio access network through the direct tunnel by using the data gateway or the serving gateway.

Further, in the GPRS network, the receiving unit 702 receives a PDP context update response message sent by the data gateway. In the EPS network, the receiving unit 702 receives a bearer change response message sent by the serving gateway.

In an apparatus for establishing a direct tunnel provided by this embodiment of the present invention, it is determined that a preset condition a sending unit sends a request message to a gateway, and the gateway establishes a downlink direct tunnel between a radio access network and the gateway according to the user plane IP address of an RNC and the downlink user plane tunnel endpoint identifier allocated by the RNC that are included in the request message, and sends a response message to a mobility management network element. In this embodiment of the present invention, according to the character of the user terminal, a downlink direct tunnel established for the user terminal that frequently switches between a connected state and an idle state is reduced. Therefore, this can reduce the number of signaling messages that need to be processed on a GGSN or an SGW, reduce signaling load on the GGSN or the SGW, and meanwhile ensure delay requirements of some services.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for establishing a direct tunnel the method, comprising:
   determining, by a mobility management network element, that a character of a user terminal satisfies a preset condition for establishing a direct tunnel, wherein a signaling load of a gateway or a number of signaling messages processed by the gateway is determined by the character of the user terminal;
   sending a request message to the gateway to establish a downlink direct tunnel between a radio access network and the gateway; and
   receiving a response message sent by the gateway to confirm that the downlink direct tunnel between the radio access network and the gateway has been successfully established, wherein the character of the user terminal comprises a signaling character of the user terminal, wherein the character of the user terminal further comprises a service attribute of the user terminal;
   wherein the signaling character of the user terminal comprises at least one of a frequency of switching between a connected state and an idle state of the user terminal and a type of the user terminal; and
   wherein the service attribute of the user terminal comprises at least one of a duration of a service corresponding to a packet data protocol (PDP) context of the user terminal or a bearer context of the user terminal, a type of the service, a duration of downlink data packets corresponding to the PDP context of the user terminal or the bearer context of the user terminal, a quantity of the downlink data packets, traffic of the downlink data packets, and a time interval between the downlink data packets.

2. The method according to claim 1, wherein, before determining that the character of the user terminal satisfies the preset condition for establishing a direct tunnel, the method further comprises:
   sending a radio access bearer assignment request to the radio access network to establish an uplink direct tunnel between the radio access network and the gateway, wherein the radio access bearer assignment request comprises a user plane internet protocol address of the gateway and an uplink user plane tunnel endpoint identifier allocated by the gateway; and
   receiving a radio access bearer assignment response sent by the radio access network, wherein the radio access bearer assignment response is used to confirm that the uplink direct tunnel between the radio access network and the gateway has been successfully established.

3. The method according to claim 1, wherein the preset condition for establishing a direct tunnel is configured on the mobility management network element.

4. The method according to claim 1, wherein the preset condition for establishing a direct tunnel is configured on an operation and maintenance network element or a parameter delivery network element and is delivered to the mobility management network element.

5. The method according to claim 1, wherein determining that the character of the user terminal satisfies the preset condition for establishing a direct tunnel comprises:
   counting a frequency of switching between a connected state and an idle state of the user terminal; and
   determining that the frequency is in a preset frequency range.

6. The method according to claim 1, wherein determining that the character of the user terminal satisfies the preset condition for establishing a direct tunnel comprises determining that a type of the user terminal is in a preset type range.

7. The method according to claim 1, wherein determining that the character of the user terminal satisfies the preset condition for establishing a direct tunnel comprises:
   counting, by the mobility management network element, a duration of a received service corresponding to a PDP context of the user terminal or a bearer context of the user terminal, and determining that the duration is in a preset duration range; or
   counting, by the mobility management network element, a quantity of downlink data packets corresponding to the PDP context of the user terminal or the bearer context of the user terminal, and determining that the quantity is in a preset quantity range; or
   counting, by the mobility management network element, traffic of the downlink data packets corresponding to the PDP context of the user terminal or the bearer context of the user terminal, and determining that the traffic is in a preset traffic range; or
   counting, by the mobility management network element, a time interval between the downlink data packets corresponding to the PDP context of the user terminal or the bearer context of the user terminal, and determining that the time interval is in a preset time interval range.

8. The method according to claim 1, wherein determining that the character of the user terminal satisfies the preset condition for establishing a direct tunnel comprises determining that a type of a service corresponding to a PDP context of the user terminal or a bearer context of the user terminal is a preset service type.

9. The method according to claim 1, wherein the gateway is a data gateway or a serving gateway.

10. An apparatus used for establishing a direct tunnel, the apparatus comprising:
a processor;
a non-transitory computer-readable storage medium storing a program to be executed by the processor, the program including instructions to:
determine that a character of a user terminal satisfies a preset condition for establishing a direct tunnel, wherein a signaling load of a gateway or a number of signaling messages processed by the gateway is determined by the character of the user terminal;
a sending unit, configured to send a request message to the gateway to establish a downlink direct tunnel between a radio access network and the gateway; and
a receiving unit, configured to receive a response message sent by the gateway to confirm that the downlink direct tunnel between the radio access network and the gateway has been successfully established, wherein the character of the user terminal comprises a signaling character of the user terminal, wherein the character of the user terminal further comprises a service attribute of the user terminal;
wherein the signaling character of the user terminal comprises at least one of a frequency of switching between a connected state and an idle state of the user terminal and a type of the user terminal; and
wherein the service attribute of the user terminal comprises at least one of a duration of a service corresponding to a PDP context of the user terminal or a bearer context of the user terminal, a type of the service, a duration of downlink data packets corresponding to the PDP context of the user terminal or the bearer context of the user terminal, a quantity of the downlink data packets, traffic of the downlink data packets, and a time interval between the downlink data packets.

11. The apparatus according to claim 10, wherein:
the sending unit is further configured to send a radio access bearer assignment request to the radio access network to establish an uplink direct tunnel between the radio access network and the gateway, wherein the radio access bearer assignment request comprises a user plane internet protocol (IP) address of the gateway and an uplink user plane tunnel endpoint identifier allocated by the gateway; and
the receiving unit is further configured to receive a radio access bearer assignment response sent by the radio access network, wherein the radio access bearer assignment response is used to confirm that the uplink direct tunnel between the radio access network and the gateway has been successfully established.

12. The apparatus according to claim 10, wherein the preset condition for establishing a direct tunnel is configured on a mobility management network element.

13. The apparatus according to claim 10, wherein the preset condition for establishing a direct tunnel is configured on an operation and maintenance network element or a parameter delivery network element and is delivered to a mobility management network element.

14. The apparatus according to claim 10, wherein the instructions to determine that a character of a user terminal satisfies a preset condition for establishing a direct tunnel comprise instructions to:
count a frequency of switching between a connected state and an idle state of the user terminal; and
determine that the frequency is in a preset frequency range.

15. The apparatus according to claim 10, wherein instructions to determine that a character of a user terminal satisfies a preset condition for establishing a direct tunnel comprise instructions to determine that a type of the user terminal is in a preset type range.

16. The apparatus according to claim 10, wherein the instructions to determine that a character of a user terminal satisfies a preset condition for establishing a direct tunnel comprise instructions to perform at least one of:
count a duration of a received service corresponding to a PDP context of the user terminal or a bearer context of the user terminal, and determine that the duration is in a preset duration range; or
count a quantity of downlink data packets corresponding to the PDP context of the user terminal or the bearer context of the user terminal, and determine that the quantity is in a preset quantity range; or
count traffic of the downlink data packets corresponding to the PDP context of the user terminal or the bearer context of the user terminal, and determine that the traffic is in a preset traffic range; or
count a time interval between the downlink data packets corresponding to the PDP context of the user terminal or the bearer context of the user terminal, and determine that the time interval is in a preset time interval range.

17. The apparatus according to claim 10, wherein instructions to determine that a character of a user terminal satisfies a preset condition for establishing a direct tunnel comprise instructions to determine that a type of a service corresponding to a PDP context of the user terminal or a bearer context of the user terminal is in a preset service type.

18. The apparatus according to claim 10, wherein the gateway is a data gateway or a serving gateway.

* * * * *